United States Patent
Bi et al.

(10) Patent No.: US 10,819,213 B2
(45) Date of Patent: Oct. 27, 2020

(54) ZERO-CURRENT DETECTOR FOR VOLTAGE CONVERTER

(71) Applicant: NXP USA, INC., Austin, TX (US)

(72) Inventors: Shenglan Bi, Tianjin (CN); Bo Fan, Tianjin (CN); Meng Wang, Tianjin (CN)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/438,473

(22) Filed: Jun. 12, 2019

(65) Prior Publication Data

US 2020/0144901 A1 May 7, 2020

(30) Foreign Application Priority Data

Nov. 6, 2018 (CN) .......................... 2018 1 1316267

(51) Int. Cl.
  *H02M 1/08* (2006.01)
  *H02M 3/158* (2006.01)
  *H02M 3/156* (2006.01)
  *H02M 1/00* (2006.01)

(52) U.S. Cl.
  CPC ........... *H02M 1/083* (2013.01); *H02M 3/158* (2013.01); *H02M 3/156* (2013.01); *H02M 2001/0009* (2013.01)

(58) Field of Classification Search
  CPC ................. H02M 1/083; H02M 3/158; H02M 2001/0009; H02M 2001/0058; H02M 3/156; H02M 3/157
  See application file for complete search history.

(56) References Cited

U.S. PATENT DOCUMENTS

| | | | |
|---|---|---|---|
| 7,868,599 B2 | 1/2011 | Rahman et al. | |
| 7,940,596 B2 | 5/2011 | Chu et al. | |
| 9,099,925 B2 | 8/2015 | Sugawara | |
| 9,276,477 B2 | 3/2016 | Thomas et al. | |

(Continued)

FOREIGN PATENT DOCUMENTS

| | | |
|---|---|---|
| CN | 101499722 A | 8/2009 |
| CN | 104753345 A | 7/2015 |

OTHER PUBLICATIONS

Chi-Lin Chen et al., "Zero Current Detection Technique for Fast Transient Response in Buck DC-DC Converters", IEEE Explore 534142008, 2008.

(Continued)

*Primary Examiner* — Alex Torres-Rivera

(57) ABSTRACT

A method for detecting zero-current of a voltage converter includes resetting a comparator output during a first period when a power switch of the voltage converter is turned on, and receiving, by an offset cancellation circuit, sample signals from the comparator. The method also determines a comparator offset using the sample signals. In response to an output voltage of the voltage converter being less than a threshold voltage, the comparator output is reset during a second period when the power switch is turned off. The comparator compares a first signal from the voltage converter with a second signal representing a ground voltage to generate a ZCD signal indicative of a comparison of the first and second signals. Then, an offset cancellation signal indicative of the determined comparator offset is generated to cancel the comparator offset.

20 Claims, 2 Drawing Sheets

(56) References Cited

U.S. PATENT DOCUMENTS

| | | | |
|---|---|---|---|
| 9,722,587 B2 | 8/2017 | Tsutsumi | |
| 9,997,992 B1 | 6/2018 | Wu et al. | |
| 2008/0231247 A1 | 9/2008 | Uehara | |
| 2008/0298106 A1* | 12/2008 | Tateishi | H02M 3/1588 363/127 |
| 2010/0033146 A1 | 2/2010 | Irissou et al. | |
| 2011/0018515 A1 | 1/2011 | McCloy-Stevens | |
| 2012/0235653 A1* | 9/2012 | Chen | H02M 3/1588 323/271 |
| 2013/0141058 A1 | 6/2013 | Kris | |
| 2014/0111168 A1* | 4/2014 | Chen | H02M 3/1588 323/235 |
| 2014/0191744 A1* | 7/2014 | Choi | H02M 3/157 323/283 |
| 2015/0207411 A1* | 7/2015 | Calhoun | H02M 1/088 323/235 |
| 2015/0333621 A1* | 11/2015 | Yang | H03F 3/45076 323/210 |
| 2016/0308441 A1* | 10/2016 | Chen | H02M 3/158 |
| 2016/0322900 A1 | 11/2016 | Xu | |
| 2018/0048232 A1 | 2/2018 | Adell et al. | |

OTHER PUBLICATIONS

Hou-Ming Chen et al., "High-Efficiency PFM Boost Converter with an Accurate Zero Current Detector", DOI 10.1109/TCSII.2017. 2754514, IEEE Transactions on Circuits and Systems II: Express Briefs 2017.

Xianzhi Meng et al., "Real Time Zero Current Detection with Low Quiescent Current for Synchronous DC-DC Converter", IEEE 2017, pp. 839-842.

Tiancong Shao et al,. "A Low-Stress Zero-Current Switching Technique for Power Converters", IEEE Transactions on Power Electronics, vol. 33, No. 6, Jun. 2018, pp. 5087-5096.

Shiquan Fan et al.,"An Ultra-Low Power (ULP) Zero-Current-Detector (ZCD) Circuit for Switching Inductor Converter Applied in Energy Harvesting System", 1570397365, EDAPS 2017.

Gao et al A Novel Zero-Current-Detector for DCM Operation in Synchronous Converter, 978-1-4673-0158-8/12, 2012 IEEE. 6 pages.

Michal, Vratislav, "Inductor Current Zero-Crossing Detector and CCM/DCM Boundary Detector for Integrated High-Current Switched-Mode DC-DC Converters," IEEE Transactions on Power Electronics, Vol. 29, No. 10, Oct. 2014, 8 pages.

* cited by examiner

ZERO-CURRENT DETECTOR FOR VOLTAGE CONVERTER

BACKGROUND

The present invention generally relates to voltage converters and, more particularly, to zero-current detectors (ZCDs) for synchronous buck converters.

Switching mode power supply (SMPS) typically are used for providing regulated power, either regulated voltages or regulated currents, to loads.

FIG. 1 shows a circuit diagram of a voltage converter 100. The voltage converter 100 includes a power circuit 102 and a control circuit 104. The power circuit 102 includes a power switch $S_1$, a synchronization switch $S_2$, an inductor L, a capacitor C, and an output resistor R. The power switch $S_1$ is implemented using a P-type transistor, and the synchronization switch $S_2$ is implemented using an N-type transistor. For the power switch $S_1$, the source terminal is coupled to an input voltage $V_{in}$, the drain terminal is coupled to the drain terminal of the synchronization switch $S_2$ and one end of the inductor L, and the gate terminal is coupled to the control circuit 104. The power switch $S_1$ is controlled by the control circuit 104. Similarly, for the synchronization switch $S_2$, the source terminal is coupled to ground, and the gate terminal is coupled to the control circuit 104 so the synchronization switch $S_2$ also is controlled by the control circuit 104. One terminal of the inductor L is coupled to the drain terminals of the power switch $S_1$ and the synchronization switch $S_2$, and another terminal of the inductor L is coupled to an output terminal that provides an output voltage $V_{out}$. The output resistor R and the capacitor C are connected in parallel between the output terminal and ground.

The control circuit 104 includes a first feedback resistor $R_1$ and a second feedback resistor $R_2$ that are connected in series between the output terminal and ground. A node between the first and second feedback resistors $R_1$ and $R_2$ provides a feedback voltage $V_{FB}$. The control circuit 104 further includes a current sensing circuit 106, a compensation circuit 108, and a PWM/PFM control circuit 110. The current sensing circuit 106 is used for sensing a current at the node between the drain terminals of the power switch $S_1$ and the synchronization switch $S_2$, as indicated by one of the dashed arrow lines in FIG. 1. The PWM/PFM control circuit 110 receives the sensed current from the sensing circuit 106 and generates a current compensation signal used in the control of the switches $S_1$ and $S_2$. The compensation circuit 108 receives the feedback voltage $V_{FB}$ and generates a voltage compensation signal used in the control of the switches $S_1$ and $S_2$.

In operation, the power switch $S_1$ is controlled to be conductive during an "on-state" so that the input voltage $V_{in}$ is provided across the inductor L to the output voltage $V_{out}$. In a subsequent "off-state", the power switch $S_1$ is controlled to be cut off, while the synchronization switch $S_2$ is controlled to be conductive. The inductor L discharges and acts as a voltage source so that the output voltage $V_{out}$ continues to be provided. The power switch $S_1$ and the synchronization switch $S_2$ are alternatively switched on to charge and discharge the inductor L, and are not both conductive at the same time to avoid shorting the input voltage $V_{in}$ to ground.

During the "off-state", the current flowing through the inductor L decreases. As the energy stored in the inductor L is provided through the output voltage $V_{out}$, the current drops to zero or even goes negative. The PWM/PFM control circuit 110 determines whether or not to cut off the switch $S_2$ to allow the negative current to be provided as the output.

Accordingly, the control circuit 104 further includes a zero-current detector (ZCD) 112, which detects if the current goes to zero, and provides a ZCD signal indicative of the detection result to the PWM/PFM control circuit 110, so that the switches $S_1$ and $S_2$ are controlled to operate in the above modes. On the one hand, the output of the ZCD 112 is critical because the PWM/PFM control circuit 110 controls the switches $S_1$ and $S_2$ depending on the ZCD signal. On the other hand, the output of the ZCD 112 is vulnerable because it is susceptible to silicon differences and various offsets. An incorrect ZCD output can cause the switches $S_1$ and $S_2$ to switch erroneously, which can corrupt the voltage converter.

Accordingly, it is desirable for a voltage converter to have a reliable ZCD.

SUMMARY

This summary is provided to introduce a selection of concepts in a simplified form that are further described below in the Detailed Description. This summary is not intended to identify key or essential features of the claimed subject matter, nor is it intended to be used to limit the scope of the claimed subject matter.

In one embodiment, the present invention provides a zero-current detector (ZCD) for a voltage converter. The ZCD includes a comparator having a first input terminal, a second input terminal, and an output terminal. The first input terminal receives a first signal from the voltage converter, the second input terminal receives a second signal representing a ground voltage, and the output terminal provides a ZCD signal in response to a comparison of the first and second signals. The comparator provides the ZCD signal as an output of the zero-current detector. An offset cancellation circuit is coupled to the comparator and is enabled in response to a power switch of the voltage converter being turned on. The offset cancellation circuit also receives sample signals from the comparator and generates a comparator offset in response to the sample signals. The offset cancellation circuit further provides an offset cancellation signal indicative of the determined offset to the comparator to cancel any comparator offset. A delay circuit is coupled to the offset cancellation circuit and, after the power switch of the voltage converter turns off, enables the offset cancellation circuit for a first predetermined duration if an output voltage of the voltage converter is less than a threshold voltage.

In another embodiment, the present invention provides a method for detecting zero-current of a voltage converter. The method includes resetting an output of a comparator during a first period in which a power switch of the voltage converter is switched on, and receiving, by an offset cancellation circuit, sample signals from the comparator, and determining a comparator offset using the sample signals. If an output voltage of the voltage converter is less than a threshold voltage, then the output of the comparator is reset during a second period in which a power switch of the voltage converter is turned off. The comparator compares a first signal from the voltage converter with a second signal representing a ground voltage to generate a ZCD signal indicative of a comparison of the first and second signals. An offset cancellation signal indicative of the determined offset is provided to the comparator to cancel a comparator offset.

In yet another embodiment, the present invention provides a synchronous buck converter that includes a power stage having a power switch and a synchronization switch that are alternatively switched on to charge and discharge an inductor. The inductor has a first terminal coupled to the power switch and the synchronization switch and a second terminal that provides an output signal of the synchronous buck converter. A control stage controls the power switch and the synchronization switch. A zero-current detector (ZCD) is coupled to the power stage and the control stage. The ZCD includes a comparator coupled to the first terminal of the inductor and ground. The comparator compares a first signal from the first terminal of the inductor with a second signal indicative of a ground voltage, and generates a ZCD signal indicative of when a current of the inductor reaches zero. An offset cancellation circuit is coupled with the comparator and, in response to the power switch being turned on, receives sample signals from the comparator and generates a comparator offset. If an output voltage of the synchronous buck converter is less than a threshold voltage, the buck converter continues to receive the sample signals from the comparator for a first period after the power switch is turned off. An offset cancellation signal indicative of the determined comparator offset is generated to cancel the comparator offset.

BRIEF DESCRIPTION OF THE DRAWINGS

So that the manner in which the above recited features of the present invention can be understood in detail, a more detailed description of the invention may be had by reference to embodiments, some of which are illustrated in the appended drawings. The appended drawings illustrate only typical embodiments of the invention and should not limit the scope of the invention, as the invention may have other equally effective embodiments. The drawings are for facilitating an understanding of the invention and thus are not necessarily drawn to scale. Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
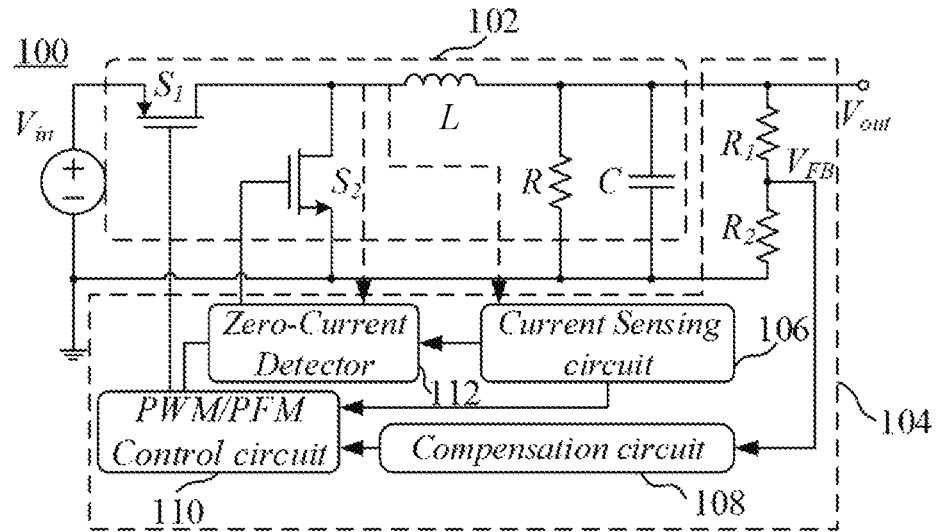
FIG. 1 is a schematic diagram of a conventional voltage converter.
Figure 2:
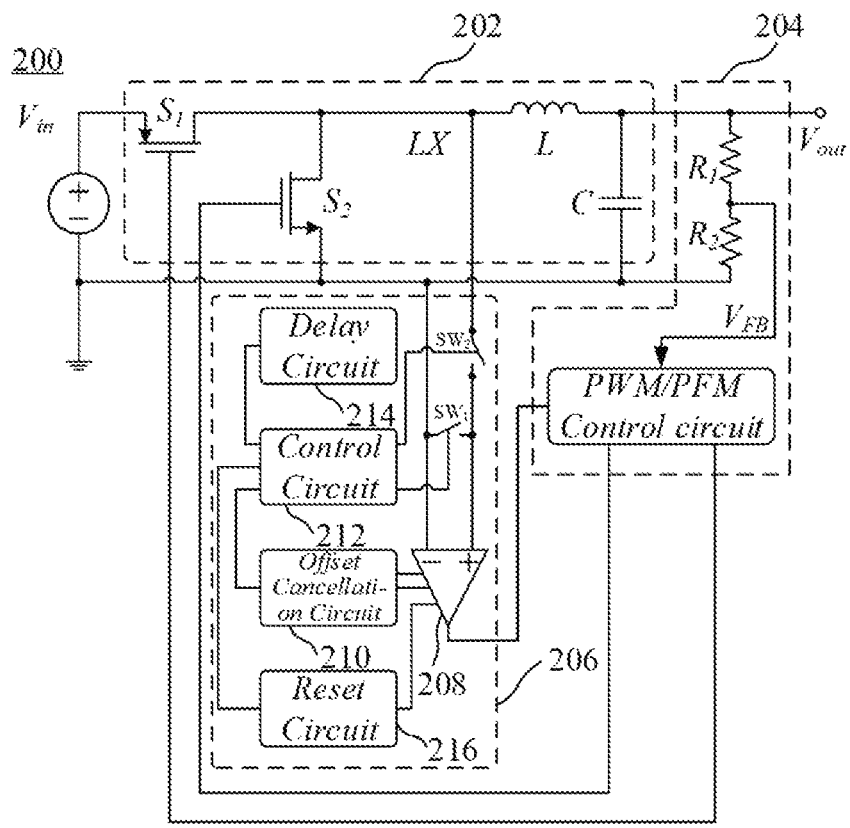
FIG. 2 is a schematic diagram of a voltage converter according to an exemplary embodiment of the present invention.

Referring now to FIG. 2, a schematic diagram of a synchronous buck converter 200 according to an exemplary embodiment of the present invention is shown. The buck converter 200 includes a power stage 202, a control stage 204, and a zero-current detector (ZCD) 206. The power stage 202 is similar to the power stage 102 shown in FIG. 1, and the control stage 204 functions similar to the control stage 104 shown in FIG. 1 (i.e., R1, R2, $V_{FB}$, and the PWM/PFM control circuit although there is not a compensation circuit), so will not be explained again.

The inductor L has a first terminal coupled to a node between the drains of the power switch $S_1$ and the synchronization switch $S_2$, and a second terminal that provides an output signal $V_{out}$ as the output of the buck converter 200. The zero-current detector (ZCD) 206 is coupled to the power stage 202 and the control stage 204. The ZCD 206 receives a first signal from a node LX between the first terminal of the inductor L and the switches $S_1$ and $S_2$, and a second signal from ground. The ZCD 206 compares includes a comparator 208 that receives and compares the first and second signals and generates a ZCD signal based on the comparison. The ZCD signal indicates when a current of the inductor L flowing from the node LX to the output terminal $V_{out}$ reaches zero. The ZCD 206 provides the ZCD signal to the PWM/PFM control circuit of the control stage 204.

The ZCD 206 further includes an auto-zero switch $SW_1$ connected between the first and second input terminals of the comparator 208, an LX enable switch $SW_2$ connected between the node LX and the first input terminal of the comparator 208, an offset cancellation circuit 210, a control circuit 212, a delay circuit 214, and a reset circuit 216. The auto-zero switch $SW_1$ is controlled by the control circuit 212 and is turned on during a first period in which the power switch $S_1$ is conductive. During the first period, the ZCD signal generated by the comparator 208 is forced to low by the control circuit 212, indicating that a zero current is not detected. During the first period, the LX enable switch $SW_2$ is opened by the control circuit 212 so that the signal from the node LX does not go to the comparator 208.

The offset cancellation circuit 210 is coupled with the comparator 208 and the control circuit 212. The offset cancellation circuit 210 is controlled by the control circuit 212 to receive sample signals from the comparator 208 during the first period. The sample signals can be signals from nodes either internal with or external to the comparator 208 that are indicative of an offset of the comparator 208. As described above, since the auto-zero switch $SW_1$ coupled between the input terminals of the comparator 208 is not an ideal switch, the inherent resistance of the auto-zero switch $SW_1$ will add to the offset of the comparator 208. Additionally, as will be understood by those of skill in the art, the silicon process differences between the comparator 208 and the peripheral circuits coupling to the comparator 208 cause noise that also adds to the offset of the comparator 208. The offset cancellation circuit 210 receives the sample signals from the comparator 208 and calculates the offset of the comparator 208. As a response, the offset cancellation circuit 210 provides an offset cancellation signal to the comparator 208 to cancel the offset during the operation of the comparator 208.

In an embodiment where the comparator 208 is implemented with multiple comparator stages, the offset cancellation circuit 210 includes multiple sub-circuits corresponding to the multiple comparator stages. Each of the sub-circuits of the offset cancellation circuit 210 receives an output signal of the corresponding comparator stage and stores the difference between the output voltage of the current comparator stage and the absolute ground voltage using, for example, an RC buffer circuit. During subsequent comparison operations of the comparator 208, the stored difference is provided back to an input of the present comparator stage as the offset cancellation signal, to reduce and cancel the offset.

The offset cancellation circuit 210 requires a setting time before the offset is detected, determined, and stored. For example, for the RC buffer circuit mentioned above for storing the offset, the setting time is at least a time period during which the comparator stage generates an output and a capacitor of the RC buffer circuit finishes being charged. However, as is also described above, the offset cancellation circuit 210 is controlled by the control circuit 212 to be enabled during the first period in which the power switch $S_1$ is switched on. If the synchronous buck converter 200 is configured to provide a low output voltage $V_{out}$, the first period, which is the switching on time of the power switch $S_1$, is relatively short. The offset cancellation circuit 210 might not be able to determine and store the offset within such a relatively short first period. Accordingly, in this embodiment, the control circuit 212 compares the output voltage $V_{out}$ of the buck converter 200 with a threshold voltage to determine if the first period is adequate for setting the offset cancellation circuit 210, and introduces a second period provided by the delay circuit 214 to set the offset cancellation circuit 210 if the output voltage $V_{out}$ is low and the switching on time of the power switch $S_1$ is short. In alternative embodiments, the control circuit 212 compares the first period with a threshold period, which is adequate for setting the offset cancellation circuit, and uses the second period if necessary. In alternative embodiments, the control circuit 212 compares a duty cycle of a switch signal that the PWM/PFM control circuit of the control stage 204 applies on the power switch $S_1$ with a threshold ratio that is a minimum setting time for offset cancellation circuit 210 over the cycle time of the switch signal, and accordingly determines whether or not to use the second period. The delay circuit 214 can use a dynamic second period, which is the difference between the first period and the setting time of the offset cancellation circuit 210, or a fixed second period.

During the second period, the control circuit 212 keeps the zero-current switch $SW_1$ on in order to reset the ZCD signal, and to enable the offset cancellation circuit 212. Although the power switch $S_1$ is switched off and the synchronization switch $S_2$ is switched on, the control circuit 212 keeps the LX enable switch $SW_2$ turned off to prevent the signal from the node LX from being provided to the comparator 208.

After the second period, the auto-zero switch $SW_1$ is switched off, and the LX enable switch $SW_2$ is switched on to allow the comparator 208 to receive the voltage on the LX node at the first input terminal and the ground voltage at the second input terminal. The offset cancellation circuit 210 stops receiving the sample signals from the comparator 208. Instead, the offset cancellation circuit 210 provides the offset cancellation signal to the comparator 208 to cancel the offset of the comparison by the comparator 208.

In switching the power switch $S_1$, the synchronization switch $S_2$, the auto-zero switch $SW_1$, and the LX enable switch $SW_2$, the voltage signal provided to the comparator 208 may have glitches that can result in incorrect ZCD signal outputs. The reset circuit 216, in response to the offset cancellation circuit 210 being disabled, resets the comparator 208 for a third period to avoid those glitches from effecting the comparator 208. In the current preferred embodiment, the third period is equal to or less than 30 ns.

Figure 3:
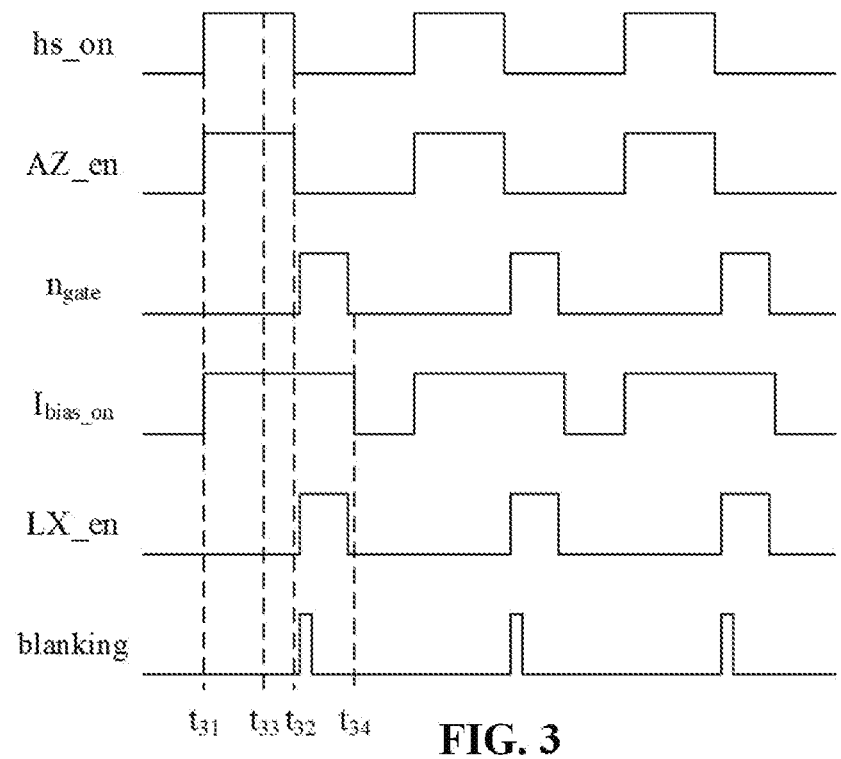
FIG. 3 is a timing diagram of signals at nodes of the voltage converter of FIG. 2 when a moderate output voltage $V_{out}$ is provided.

FIG. 3 is a timing diagram of signals in the synchronous buck converter 200 of FIG. 2 in an application where a high or moderate output voltage $V_{out}$ is provided. The signals in FIG. 3 are explained as:

| | |
|---|---|
| hs_on | switching signal that the PWM/PFM control circuit of the control stage 204 applies on the power switch $S_1$ |
| AZ_en | enable signal that the control circuit 212 applies on the offset cancellation circuit 210 |
| $n_{gate}$ | switching signal that the PWM/PFM control circuit of the control stage 204 applies on the synchronization switch $S_2$ |
| $I_{bias\_on}$ | bias current signal applied on the comparator 208 |
| LX_en | switching signal that the control circuit applies on the LX enable switch $SW_2$ |
| blanking | reset signal that the reset circuit 216 applies on the comparator 208 |

In applications where a high or moderate output voltage $V_{out}$ is provided, the power switch $S_1$ must be conductive for a long first period from time $t_{31}$ to $t_{32}$, which is, for example, longer than a threshold setting time of the offset cancellation circuit 210, i.e., from time $t_{31}$ to $t_{33}$. The offset cancellation circuit 210 is enabled to receive the sample signals from the comparator 208 for setting up and determining the offset while the power switch $S_1$ is switched on. During this period from time $t_{31}$ to $t_{32}$, the synchronization switch $S_2$ is switched off, the LX enable switch $SW_2$ is switched off to prevent the first input terminal of the comparator 208 from receiving the signal from the node LX, and the bias current $I_{bias}$ is applied on the comparator 208 for its normal operation.

At time $t_{32}$, which is the end of the first period, the PWM/PFM control circuit of the control stage 204 turns off the power switch $S_1$. The PWM/PFM control circuit of the control stage 204 turns on the synchronization switch $S_2$ almost simultaneously with or shortly after the time $t_{32}$. The control circuit 212 of the ZCD 206 determines that the first period is, in the current embodiment, longer than the threshold setting time required by the offset cancellation circuit 210 and determines that the second period control is not required. In response, the control circuit 212 stops enabling the offset cancellation circuit 210, opens the auto-zero switch $SW_1$, and closes the LX enable switch $SW_2$. The control circuit 212 enables the reset circuit 216 to reset the ZCD signal of the comparator 208 for the third period. At time $t_{34}$ when the PWM/PFM control circuit of the control stage 204 turns off the synchronization switch $S_2$, all the signals are reset. The bias current $I_{bias}$ is stopped from being provided during a falling edge of $n_{gate}$ and a rising edge of hs_on to save power.

Figure 4:
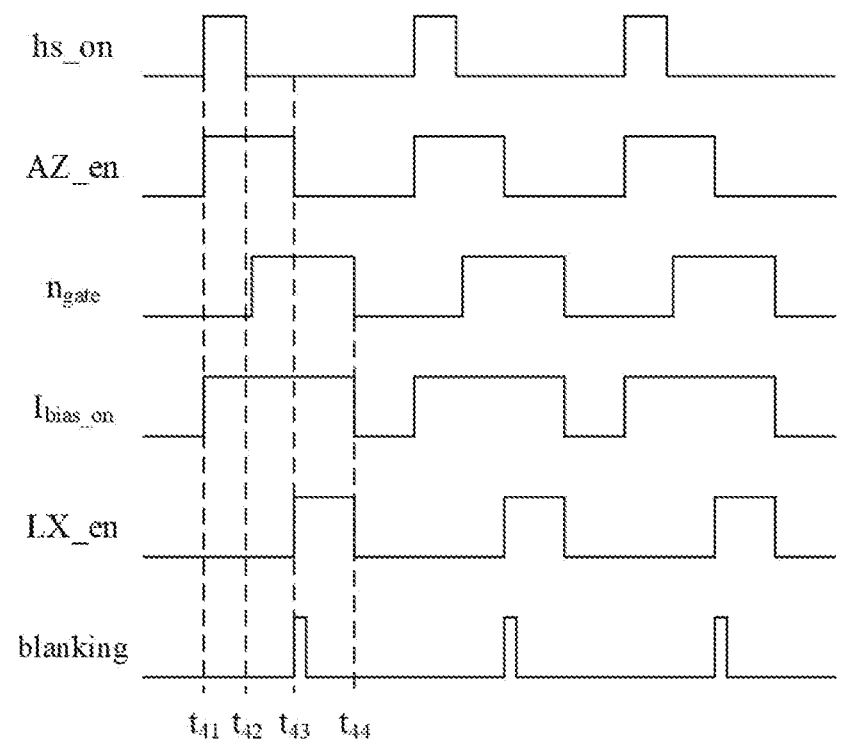
FIG. 4 is a timing diagram of signals at nodes of the voltage converter of FIG. 2 when a low voltage $V_{out}$ is provided.

FIG. 4 is a timing diagram of signals in the synchronous buck converter 200 of FIG. 2 in an application where a low output voltage $V_{out}$ is provided. The signals in FIG. 4 have the same explanations as those in FIG. 3.

In applications where a low output voltage $V_{out}$ is provided, the power switch $S_1$ must be conductive for a short first period from time $t_{41}$ to $t_{42}$, which is shorter than the threshold setting time of the offset cancellation circuit 210, for example from time $t_{41}$ to $t_{43}$. The offset cancellation circuit 210 is enabled to receive the sample signals from the comparator 208 for setting up and determining the offset while the power switch $S_1$ is turned on. During this period from time $t_{41}$ to $t_{42}$, the synchronization switch $S_2$ is switched off, the LX enable switch $SW_2$ is switched off to prevent the first input terminal of the comparator 208 from receiving the signal from the node LX, and the bias current $I_{bias}$ is applied to the comparator 208 for its normal operation.

At time $t_{42}$, which is the end of the first period, the PWM/PFM control circuit of the control stage 204 switches off the power switch $S_1$, and switches on the synchronization switch $S_2$ substantially simultaneously with or shortly after the time $t_{42}$. The control circuit 212 determines that the first period is shorter than the threshold setting time required by the offset cancellation circuit 210 and applies the second period to further enable the offset cancellation circuit 210 until at least the threshold setting time is reached. During the second period, the control circuit 212 keeps the auto-zero switch SW$_1$ on and the LX enable switch SW$_2$ off, and forces the ZCD signal provided by the comparator 208 to stay low. Accordingly, voltage glitches due to switching of the power switch S$_1$ and the synchronization switch S$_2$ do not go to the comparator 208 and cause incorrect ZCD outputs. At time t$_{43}$, which is an end of the second period, the offset cancellation circuit 210 finishes the setting, the control circuit 212 stops enabling the offset cancellation circuit 210, opens the auto-zero switch SW$_1$, and closes the LX enable switch SW$_2$. The control circuit 212 enables the reset circuit 216 to reset the ZCD signal of the comparator 208 for the third period. At time t$_{44}$ when the PWM/PFM control circuit of the control stage 204 switches off the synchronization switch S$_2$, all the signals are reset.

It should now be apparent that the embodiments described provide a zero-current detector for a synchronous buck converter. The ZCD includes an offset cancellation circuit that cancels comparator offset. The ZCD introduces a delay period for the offset cancellation circuit so that it can adequately detect and determine the offset. A blanking period is introduced around the switching of the switches to avoid incorrect ZCD detection turnovers from voltage glitches. The ZCD cancels comparator offsets and avoids glitches.

The use of the terms "a" and "an" and "the" and similar referents in the context of describing the subject matter (particularly in the context of the following claims) are to be construed to cover both the singular and the plural, unless otherwise indicated herein or clearly contradicted by context. The terms "coupled" and "connected" both mean that there is an electrical connection between the elements being coupled or connected, and neither implies that there are no intervening elements. Recitation of ranges of values herein are intended merely to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

The invention claimed is:

1. A zero-current detector for a voltage converter, comprising:
   a comparator having a first input terminal that receives an first signal from the voltage converter, a second input terminal that receives a second signal representing a ground voltage, and an output terminal that provides a Zero Current Detection (ZCD) signal in response to a comparison of the first and second signals, wherein the ZCD signal is an output of the zero-current detector;
   an offset cancellation circuit coupled to the comparator that (i) is enabled in response to a power switch of the voltage converter being switched on, (ii) receives sample signals from the comparator and determines an offset of the comparator in response to the sample signals, and (iii) provides an offset cancellation signal indicative of the determined offset to the comparator to cancel the comparator offset generated in response to comparing the first and second signals; and
   a delay circuit coupled to the offset cancellation circuit, wherein, after the power switch switches off, the delay circuit enables the offset cancellation circuit for a first predetermined duration in response to an output voltage of the voltage converter being less than a threshold voltage.

2. The zero-current detector of claim 1, further comprising:
   a control circuit that resets the ZCD signal on the output terminal of the comparator in response to the offset cancellation circuit being enabled.

3. The zero-current detector of claim 1, further comprising:
   a reset circuit coupled to the comparator that resets the comparator for a second predetermined duration in response to the offset cancellation circuit not being enabled.

4. The zero-current detector of claim 3, wherein the second predetermined duration is equal to or less than 30 ns.

5. The zero-current detector of claim 1, further comprising:
   an auto-zero switch coupled between the first and second input terminals of the comparator, wherein the auto-zero switch is closed when the offset cancellation circuit is enabled.

6. The zero-current detector of claim 1, further comprising:
   an LX enable switch coupled to the first input terminal of the comparator, wherein the LX enable switch is closed when the offset cancellation circuit is not enabled so that the first signal from the voltage converter is provided to the comparator.

7. The zero-current detector of claim 1, further comprises:
   a control circuit that compares a duty cycle of a switch signal applied to the power switch of the voltage converter with a threshold ratio to determine that the output voltage of the voltage converter is less than the threshold voltage.

8. A method for detecting zero-current of a voltage converter, comprising:
   resetting a comparator output during a first period in which a power switch of the voltage converter is switched on;
   receiving, by an offset cancellation circuit, sample signals from the comparator, and determining a comparator offset based on the sample signals;

in response to an output voltage of the voltage converter being less than a threshold voltage, resetting the comparator output during a second period in which the power switch of the voltage converter is switched off;

comparing by the comparator a first signal from the voltage converter with a second signal representing a ground voltage to generate a Zero Current Detection (ZCD) signal indicative of a comparison of the first and second signals; and providing an offset cancellation signal to the comparator that is indicative of the determined offset to cancel the comparator offset.

9. The method of claim 8, further comprising:

enabling the offset cancellation circuit to receive the sample signals from the comparator during the first and second periods, wherein the offset cancellation circuit stops receiving the sample signals from the comparator and determines the offset after the second period.

10. The method of claim 8, further comprising:

resetting the ZCD signal during a third period in response to the offset cancellation circuit being disabled.

11. The method of claim 10, wherein the third period is equal to or less than 30 ns.

12. The method of claim 10, further comprising, during the first and second periods:

cutting off the first signal from being provided to the comparator; and shorting first and second input terminals of the comparator, wherein the first and second input terminals are respectively configured to receive the first and second signals.

13. The method of claim 8, further comprising:

comparing a duty cycle of a switch signal applied on the power switch of the voltage converter with a threshold ratio to determine if the output voltage of the voltage converter is less than the threshold voltage.

14. A synchronous buck converter, comprising:

a power stage including a power switch and a synchronization switch that are switched on alternately to charge and discharge an inductor having a first terminal coupled to the power switch and the synchronization switch and a second terminal that provides an output signal as an output of the synchronous buck converter;

a control stage that controls the power switch and the synchronization switch; and a zero-current detector coupled to the power stage and the control stage, wherein the zero-current detector comprises:

a comparator coupled to the first terminal of the inductor and ground, wherein the comparator compares a first signal from the first terminal of the inductor with a second signal indicative of a ground voltage, and generates a Zero Current Detection (ZCD) signal that indicates when a current of the inductor reaches zero; and an offset cancellation circuit coupled to the comparator and configured to:

in response to the power switch being switched on, receive sample signals from the comparator and determine an offset of the comparator;

in response to an output voltage of the synchronous buck converter being less than a threshold voltage, continue to receive the sample signals from the comparator for a first period after the power switch of the power stage is switched off; and generate an offset cancellation signal indicative of the determined comparator offset to cancel the comparator offset.

15. The synchronous buck converter of claim 14, wherein the zero-current detector further comprises an auto-zero switch coupled between a first input terminal and a second input terminal of the comparator, wherein the auto-zero switch is closed during a period when the power switch is switched on and during the first period.

16. The synchronous buck converter of claim 15, wherein the zero-current detector further comprises an LX enable switch coupled between the first terminal of the inductor and the comparator, wherein the LX enable switch is open during a period when the power switch of the power stage is switched on and during the first period to stop the first signal from the voltage converter from being provided to the comparator.

17. The synchronous buck converter of claim 14, wherein the zero-current detector further comprises a reset circuit that resets the ZCD signal for a second period in response to the first period lapsing.

18. The synchronous buck converter of claim 17, wherein the offset cancellation circuit receives the samples signals during the second period.

19. The synchronous buck converter of claim 17, wherein the second period is equal to or less than 30 ns.

20. The synchronous buck converter of claim 14, wherein the zero-current detector further comprises a control circuit that compares a duty cycle of a switch signal applied to the power switch with a threshold ratio to determine when the output voltage is less than the threshold voltage.

* * * * *